United States Patent [19]

Smolka et al.

[11] Patent Number: 5,725,730
[45] Date of Patent: *Mar. 10, 1998

[54] AQUEOUS DISPERSIONS CONTAINING CARBOXYLIC ACIDS AND/OR RESINIC ACIDS FOR DEINKING PRINTED WASTEPAPER

[75] Inventors: Heinz-Gerd Smolka; Klaus Lehmann, both of Illertissen; Hans Hawel, Voehringen; Dieter Schraml, Illertissen; Klaus Hornfeck, Mettmann, all of Germany

[73] Assignee: Gruenau Illertissen, Illertissen, Germany

[*] Notice: The portion of the term of this patent subsequent to Apr. 20, 2012, has been disclaimed.

[21] Appl. No.: 328,335

[22] Filed: Oct. 24, 1994

Related U.S. Application Data

[63] Continuation of Ser. No. 142,646, Oct. 25, 1993, abandoned, which is a continuation of Ser. No. 848,993, filed as PCT/EP90/01698 Oct. 10, 1990, published as WO91/05906 May 2, 1991, abandoned.

[30] Foreign Application Priority Data

Oct. 19, 1989 [DE] Germany ............................ 39 34 882.2
Oct. 10, 1990 [WO] WIPO ........................ PCT/EP90/01698

[51] Int. Cl.$^6$ ........................................................ D21C 5/02
[52] U.S. Cl. ........................................................ 162/5; 162/8
[58] Field of Search ........................................ 162/5, 6, 7, 8

[56] References Cited

U.S. PATENT DOCUMENTS

| | | | |
|---|---|---|---|
| 4,561,933 | 12/1985 | Wood et al. | 162/5 |
| 4,586,982 | 5/1986 | Poppel et al. | 162/5 |
| 4,666,558 | 5/1987 | Wood et al. | 162/5 |
| 4,877,556 | 10/1989 | Wilsberg et al. | 252/544 |
| 5,362,363 | 11/1994 | Smolka et al. | 162/8 |

FOREIGN PATENT DOCUMENTS

| | | | |
|---|---|---|---|
| 30978 | 2/1984 | Japan | 162/5 |

*Primary Examiner*—Karen M. Hastings
*Attorney, Agent, or Firm*—Ernest G. Szoke; Wayne C. Jaeschke; Real J. Grandmaison

[57] ABSTRACT

The invention relates to aqueous dispersions containing A. $C_{6-22}$ carboxylic acids and/or resinic acids and B. $C_{6-22}$ oxoalcohols alkoxylated with 2 to less than 6 mol $C_{2-4}$ alkylene oxides for deinking printed wastepaper.

5 Claims, No Drawings

AQUEOUS DISPERSIONS CONTAINING CARBOXYLIC ACIDS AND/OR RESINIC ACIDS FOR DEINKING PRINTED WASTEPAPER

This application is a continuation of application Ser. No. 08/142,646 filed on Oct. 25, 1993, which is a continuation of Ser. No. 07/848,993 filed on Apr. 20 1992, both of which are now abandoned, and Ser. No. 07/848,993 is the national stage filing of PCT/EP90/01698 filed Oct. 10, 1990, published as WO91/05906 May 2, 1991.

BACKGROUND OF THE INVENTION

1. Field of the Invention

This invention relates to aqueous dispersions containing carboxylic acids and/or resinic acids for deinking printed wastepaper and to the use of aqueous dispersions containing A. $C_{6-22}$ carboxylic acids and/or resinic acids and B. $C_{6-22}$ oxoalcohols alkoxylated with 2 to less than 6 mol $C_{2-4}$ alkylene oxides for deinking printed wastepaper.

2. Discussion of Related Art

Today, wastepaper is used in large quantities for the production of, for example, newsprint and sanitary paper. The quality of these types of paper is determined by their lightness and color. To be able to produce high-quality paper, the printing inks have to be removed from the printed wastepaper. This is normally done by deinking processes essentially comprising two steps, namely:

1. disintegrating the wastepaper, i.e. fiberizing in water in the presence of the chemicals required for detachment of the printing ink particles and
2. removal of the detached printing ink particles from the fiber suspension.

The second step can be carried out by washing or flotation (Ullmanns Encyclopädie der technischen Chemie, 4th Edition, Vol. 17, pages 570–571 (1979)). In flotation, which utilizes the difference in wettability between printing inks and paper fibers, air is forced or drawn through the fiber suspensions. Small air bubbles attach themselves to the printing ink particles and form a froth at the surface of the water which is removed by savers.

The deinking of wastepaper is normally carried out at alkaline pH values in the presence of alkali metal hydroxides, alkali metal silicates, oxidative bleaches and surfactants at temperatures in the range from 30° to 50° C. Soaps and/or fatty alcohol polyglycol ethers are often used as surfactants which are responsible for the detachment, separation and collection of the printing ink particles.

It is known from DE-PS 15 17 172 that good deinking results are obtained when fatty acids are used in processes for decoloring wastepaper. However, fatty acids and, in particular, saturated fatty acids can only be coarsely dispersed in the alkaline liquor of the pulper and are only partly saponified so that the fatty acids are only partly effective in the deinking process. Accordingly, there has been no shortage of attempts in the past to avoid the disadvantages involved in the use of fatty acids in the regeneration of wastepaper. Thus, DE-PS 31 23 353, for example, describes a process for deinking printed waste-paper in which fatty acids and/or resinic acids and dispersants in the form of an oil-in-water emulsion are used. Anionic and/or nonionic surfactants, for example alkali metal and/or amine salts of fatty alcohol polyglycol ether sulfates, fatty acid polyglycol esters and/or fatty alcohol polyglycol ethers are mentioned as dispersants. In addition, it is known from DE-OS 37 29 446 that aqueous fatty acid dispersions containing mono- and/or diesters of polyhydric alcohols and anionic surfactants are suitable for the deinking of wastepaper. Saturated fatty acids are used as the fatty acids and glycerol mono- and/or glycerol diesters of saturated carboxylic acids, isopropyl stearate and/or isopropyl palmitate are used as the mono- and/or diesters.

Although the dispersion and saponification of fatty acids, which are used in the form of aqueous dispersions together with nonionic and/or anionic dispersants, are improved by comparison with pure fatty acids, the improvements obtained are still unsatisfactory in many cases. More particularly, the known fatty acid dispersions form such stable ink-containing froths during flotation that foam inhibitors have to be used in the paper stock suspensions.

The problem addressed by the present invention was to develop aqueous, finely divided, storable fatty acid dispersions which would promote rapid saponification of the fatty acids in paper stock suspensions and which, in flotation, would form froths of which the stability would eliminate the need to use foam inhibitors.

DESCRIPTION OF THE INVENTION

Other than in the operating examples, or where otherwise indicated, all numbers expressing quatities of ingredients or reaction conditions used herein are to be understood as modified in all instances by the term "about".

It has now been found that the stringent demands made of the fatty acid dispersions to be developed are satisfied by dispersions containing $C_{6-22}$ carboxylic acids and/or resinic acids in combination with alkoxylated $C_{6-22}$ oxoalcohols having degrees of alkoxylation of 2 to below 6.

Accordingly, the present invention relates to aqueous dispersions containing carboxylic acids and/or resinic acids for deinking printed wastepaper which are characterized in that the dispersions contain A. $C_{6-22}$ carboxylic acids and/or resinic acids and B. $C_{6-22}$ oxoalcohols alkoxylated with 2 to less than 6 mol $C_{6-4}$ alkylene oxides.

The present invention also relates to the use of aqueous dispersions containing A. $C_{6-22}$ carboxylic acids and/or resinic acids and B. $C_{6-22}$ oxoalcohols alkoxylated with 2 to less than 6 mol $C_{2-4}$ alkylene oxides for deinking printed wastepaper.

Suitable $C_{6-22}$ carboxylic acids and/or resinic acids may be saturated and/or unsaturated, may contain and/or may be free from OH groups and may be linear, branched and/or cyclic. $C_{6-22}$ carboxylic acids are preferably aliphatic. Resinic acids may be aliphatic or aromatic and may contain one or more acid functions. Caproic acid, capric acid, lauric acid, myristic acid, palmitic acid, stearic acid, oleic acid, ricinoleic acid, tallow fatty acid, palm oil fatty acid, synthetic $C_{6-22}$ fatty acids, abietic acid, agathenic acid and/or illuric acid are examples of carboxylic acids and/or resinic acids which may be used in aqueous dispersions in accordance with the invention. Aliphatic $C_{12-18}$ carboxylic acids of natural and/or synthetic origin are preferably used.

The alkoxylated oxoalcohols present in the aqueous dispersions to be used in accordance with the invention can be obtained by oxo synthesis (Kirk Othmer: Encyclopedia of Chemical Technology, Vol. 1, pp. 747 to 751 (1978)). The educts used are olefins which are reacted with carbon monoxide and hydrogen in the presence of catalysts, for example cobalt catalysts, at temperatures of 50° to 200° C. and under pressures of 20.2 to 30.3 MPa to form aldehydes. The aldehydes obtained, which have one carbon atom more than the olefins used, are then reduced by hydrogenation to the corresponding primary alcohols (oxoalcohols). If linear olefins are used as starting materials, mixtures of linear and branched alcohols are obtained. If, by contrast, branched olefins are used, branched alcohols only are obtained. According to the invention, branched $C_{6-22}$ oxoalcohols may be used either on their own or in combination with linear $C_{6-22}$ oxoalcohols. Oxoalcohols containing 6 to 13 carbon atoms are preferred. The alkoxylation of the oxoalcohols with $C_{2-4}$ alkylene oxides, preferably with ethylene oxide and/or propylene oxide, is carried out by known industrial processes (cf. for example "Chemische Technologie", Vol. 7, pp. 131–132, Carl-Hanser-Verlag, München-Wien (1986)). The average degree of alkoxylation corresponds to the molar quantity of alkylene oxides added on and is from 2 to below 6 and preferably from 3 to 5.

The aqueous dispersions to be used in accordance with the invention preferably contain 10 to 60% by weight and more preferably 20 to 45% by weight of component A. and 0.1 to 6% by weight and more preferably 0.1 to 2.5% by weight alkoxylated oxoalcohols.

The dispersions may contain as optional constituents inorganic compounds, such as kaolins, talcum, calcium carbonate and/or alkali metal and/or alkaline earth alumino silicates corresponding to general formula I

0.7–1.5 $cat_{2/n}O \cdot Al_2O_3 \cdot 0.8$–6 $SiO_2$ in which cat represents alkali metal and/or alkaline earth metal cations and n is the valency of the metal cations, for example zeolite A, in quantities of 0.5 to 20% by weight and also nonionic and/or anionic surfactants in quantities of 0.25 to 25% by weight. Where anionic surfactants are used, their content in the dispersions is between 1 and 10% by weight, based on the carboxylic acid and/or resinic acid content.

Suitable nonionic surfactants are, for example, alkyl polyglycol ether, hydroxyalkyl polyglycol ether, alkenyl polyglycol ether, alkaryl polyglycol ether, acyl polyglycol ester and/or polyoxyethylene glycerol fatty acid ester respectively containing 8 to 22 C atoms in the linear or branched or cyclic hydrocarbon radicals and 6 to 100 mol ethylene oxide. Suitable anionic surfactants are, for example, alkali metal and/or amine salts of alkyl sulfates, alkyl polyglycol ether sulfates, alkyl aryl polyglycol ether sulfates, alkyl sulfonates, alkyl aryl sulfonates and/or protein fatty acid condensates. The anionic surfactants mentioned contain 8 to 22 C atoms in the hydrocarbon radicals. The average degree of alkoxylation of the ether sulfates is between 1 and 30.

The dispersions to be used in accordance with the invention can be produced in known manner by preparing mixtures of a) carboxylic acids and/or resinic acids and b) alkoxylated oxoalcohols at a temperature of 65° to 90° C. These mixtures preferably contain 1 to 20% by weight water. They may also contain inorganic compounds as optional constituents. The dispersions obtained contain the entire quantity of or only part of the alkoxylated oxoalcohols present in the dispersions to be produced. The fatty-acid-containing dispersions heated at 65° to 90° C. are added with stirring to water at 20° to 60° C. or to aqueous mixtures heated at 20° to 60° C. which contain anionic and/or nonionic surfactants and/or alkoxylated oxoalcohols. The dispersions obtained are then cooled with stirring to temperatures of 15° to 25° C. and subsequently homogenized in known manner at those temperatures.

In the dispersions to be used in accordance with the invention, the carboxylic acids and/or resinic acids are so finely distributed that they are saponified very quickly and completely. The dispersions are distinguished by high stability in storage.

The aqueous dispersions to be used in accordance with the invention are preferably added to paper stock suspensions in quantities of 0.2 to 2.0% by weight and more preferably in quantities of 0.2 to 1.5% by weight, based on air-dry paper stock. Air-dry paper stock means that an equilibrium state of internal moisture has been established in the paper stock. This equilibrium state depends on the temperature and relative humidity of the air.

In the presence of the aqueous dispersions used in accordance with the invention, printing inks of varying chemical composition, for example rotary newsprint inks, book printing inks, offset printing inks, illustration intaglio printing inks, flexographic printing inks, laser printing inks and/or packaging intaglio printing inks, may be removed from printed wastepaper, for example newspapers, magazines, computer paper, journals, brochures, forms, telephone directories and/or catalogues.

Printed wastepaper is refined at 20° to 60° C. in a pulper in an aqueous solution typically containing 0.5 to 3.0% by weight hydrogen peroxide (100% by weight), 0.5 to 2.5% by weight sodium hydroxide (100% by weight), 2.0 to 5.0% by weight soda waterglass (ratio by weight $SiO_2$ to $Na_2O$= 3.3:1, solids content 35% by weight), 0.2 to 2.0% by weight aqueous dispersions according to the invention and 0.1 to 0.3% by weight complexing agent—all percentages by weight are based on air-dry wastepaper—at a pulp density of, for example, 1 to 15% by weight. After a residence time of 1 to 3 hours at temperatures of 20° to 60° C., the paper stock suspensions are stirred into water or water is added to them so that 0.8 to 2% by weight paper stock suspensions are obtained. After removal of the coarse, non-floatable constituents present in the paper stock suspensions, the detached printing ink particles are removed from the paper stock suspensions in known manner by flotation.

Wastepaper deinked in the presence of aqueous dispersions according to the invention are distinguished by very high degrees of whiteness. During flotation, the dispersions according to the invention form ink-containing froths, which, irrespective of the wastepaper used, are considerably less stable compared with froths of the dispersions containing carboxylic acids and/or resinic acids typically used, so that the dispersions according to the invention can be used without addition of foam inhibitors.

EXAMPLES

In the following, quantities in "parts" are "parts by weight". The viscosities were measured with a Brookfield viscosimeter.

Preparation of Dispersions According to the Invention

Dispersion A

576 Parts water were heated to 70° C. in a heatable and coolable reaction vessel equipped with a cross propeller stirrer and a heatable feed vessel and 50 parts n-octadecanol·20 mol ethylene oxide (EO) were then added with stirring. The aqueous homogeneous mixture was then cooled to 30° C. 300 Parts animal $C_{12-18}$ fatty acid, 10 parts isotridecyl alcohol·4 mol EO and 64 parts water were introduced into the feed vessel, which was equipped with a cross propeller stirrer, and mixed while stirring at 70° to 80° C. After the addition, the mixture was cooled to 18°–20° C. and homogenized.

A 36% by weight thinly liquid, very fine, faintly blue-tinged dispersion was obtained and, even after standing for three months at room temperature (15°–25° C.), showed no signs of separation. Its viscosity at 20° C. measured 180 mPa.s Dispersion B An aqueous, homogeneous mixture of 603 parts water and 25 parts n-octadecanol·20 mol EO and a fatty-acid-containing mixture of 300 parts animal $C_{12-18}$ fatty acid, 5 parts isotridecyl alcohol·4 mol EO and 67 parts water were prepared in the same way as described for dispersion A. The fatty-acid-containing dispersion heated at 70° C. was then added with stirring to the aqueous mixture kept at 30° C. After the addition, the mixture was cooled with stirring to 18° to 20° C. and subsequently homogenized.

A 33% by weight, thinly liquid, finely divided dispersion was obtained and, even after standing for three months at room temperature (15°–25° C.), showed no signs of separation. Its viscosity at 20° C. measured 200 mPa.s Dispersion C An aqueous, homogeneous mixture of 576 parts water, 40 parts n-octadecanol·20 mol EO and 10 parts polyoxyethyl glycerol $C_{16-18}$ fatty acid ester—20 EO and a fatty-acid-containing mixture of 300 parts animal $C_{12-18}$ fatty acid, 10 parts isotridecyl alcohol·4 mol EO and 64 parts water were prepared in the same way as described for dispersion A. The fatty-acid-containing mixture heated at 70° C. was then added with stirring to the aqueous mixture kept at 30° C. After the addition, the mixture was cooled with stirring to 18° to 20° C. and subsequently homogenized.

A 36% by weight, thinly liquid, very fine, faintly blue-tinged dispersion was obtained and, even after standing for three months at room temperature (15°–25° C.), showed no signs of separation. Its viscosity at 20° C. measured 220 mPa.s.

Dispersion D

An aqueous, homogeneous mixture of 520 parts water and 45 parts n-octadecanol·20 mol EO and a fatty-acid-containing mixture of 270 parts animal $C_{12-18}$ fatty acid, 9 parts isotridecyl alcohol·4 mol EO, 100 parts kaolin (technical) grade and 56 parts water were prepared in the same way as described for dispersion A. The fatty-acid-containing mixture heated to 70° C. was then added with stirring to the aqueous mixture kept at 30° C. After the addition, the mixture was cooled with stirring to 18° to 20° C. and subsequently homogenized.

A 42% by weight, thinly liquid, fine, faintly blue-tinged dispersion was obtained and, even after standing for three months at room temperature (15°–25° C.), showed no signs of separation. Its viscosity at 20° C. measured 200 mPa.s.

Dispersion E

An aqueous, homogeneous mixture of 548 parts water and 47.5 parts n-octadecanol·20 mol EO and a fatty-acid-containing mixture of 285 parts animal $C_{12-18}$ fatty acid, 9.5 parts isotridecyl alcohol·4 mol EO, 50 parts kaolin (technical) grade and 60 parts water were prepared in the same way as described for dispersion A. The fatty-acid-containing mixture heated at 70° C. was then added with stirring to the aqueous mixture kept at 30° C. After the addition, the mixture was cooled with stirring to 18° to 20° C. and subsequently homogenized.

A 39% by weight, thinly liquid, fine, faintly blue-tinged dispersion was obtained and, even after standing for three months at room temperature (15°–25° C.), showed no signs of separation. Its viscosity at 20° C. measured 220 mPa.s.

Dispersion F

An aqueous, homogeneous mixture of 576 parts water, 40 parts n-octadecanol·20 mol EO and 10 parts protein $C_{12-14}$ fatty acid condensate, potassium salt, and a fatty-acid-containing mixture of 300 parts animal $C_{12-18}$ fatty acid, 10 parts isotridecyl alcohol·4 mol EO and 64 parts water were prepared in the same way as described for dispersion A. The fatty-acid-containing mixture heated at 70° C. was then added with stirring to the aqueous mixture kept at 30° C. After the addition, the mixture was cooled with stirring to 18° to 20° C. and subsequently homogenized.

A 36% by weight, thinly liquid, very fine, blue-tinged dispersion was obtained and, even after standing for three months at room temperature (15°–25° C.), showed no signs of separation. Its viscosity at 20° C. measured 200 mPa.s Dispersion G An aqueous, homogeneous mixture of 576 parts water, 40 parts n-octadecanol·20 mol EO and 10 parts $C_{12-14}$ alkyl polyglycol ether sulfate—4 EO, sodium salt, and a fatty-acid-containing mixture of 300 parts animal $C_{12-18}$ fatty acid, 10 parts isotridecyl alcohol·4 mol EO and 64 parts water were prepared in the same way as described for dispersion A. The fatty-acid-containing mixture heated at 70° C. was then added with stirring to the aqueous mixture kept at 30° C. After the addition, the mixture was cooled with stirring to 18° to 20° C. and subsequently homogenized.

A 36% by weight, thinly liquid, very fine and faintly blue-tinged dispersion was obtained and, even after standing for three months at room temperature (15°–25° C.), showed no signs of separation and had a viscosity at 20° C. of 200 mPa.s.

Dispersion H

An aqueous, homogeneous mixture of 576 parts water and 50 parts n-octadecanol·20 mol EO and a fatty-acid-containing emulsion of 300 parts of a synthetic fatty acid (acid value 190 to 200), 10 parts isotridecyl alcohol·4 mol EO and 64 parts water were prepared in the same way as described for dispersion A. The fatty-acid-containing emulsion heated to 70° C. was then added with stirring to the aqueous mixture kept at 30° C. After the addition, the mixture was cooled to 18° to 20° C. and subsequently homogenized.

A 36% by weight, thinly liquid, very fine, faintly blue-tinged dispersion was obtained and, even after standing for three months at room temperature (15°–25° C.), showed no signs of separation. Its viscosity at 20° C. measured 240 mPa.s Application Examples 110 g air-dry (=100 g bone-dry) printed wastepaper (50% by weight newspapers and 50% by weight magazines) were disintegrated with 1890 ml of an aqueous solution containing (based on air-dry wastepaper)

1% by weight sodium hydroxide (100% by weight)

3.0% by weight soda waterglass (ratio by weight $SiO_2$ to $Na_2O$=3.3:1, solids content 35% by weight)

0.2% by weight of a 40% by weight aqueous solution of diethylenetriamine pentaacetic acid sodium salt 0.85 % by weight hydrogen peroxide (100% by weight) and 0.7 % by weight aqueous dispersion according to the invention for 15 minutes at 45° C. and at a pulp density of 5% by weight using a dispersion disk (2500 revolutions per minute). The water used had a hardness of 17°Gh (German hardness). After 2 hours at 45° C., the paper stock suspensions were diluted with 4 1 water, 17°Gh, and the coarse, non-floatable components present in the paper stock suspensions were removed in 5 minutes in a deflaker. The deflaked paper stock suspensions were then transferred to a laboratory flotation cell, made up with water, 17°Gh, to the level of the froth overflow of the cell and subsequently floated for 10 minutes, the level being kept constant at the froth overflow by addition of water. The paper stock suspensions obtained were then thickened to a pulp density of 20% by weight and diluted to a pulp density of 4% by weight by addition of 800 ml water, 17°Gh, disintegrated and acidified to pH 6 with dilute sulfuric acid.

Quantities of 100 g of these paper stock suspensions were then made up with water to 500 ml (pulp density: 0.8% by weight) and filtered under suction through a filter paper (diameter 12 cm). The sheet of paper thus formed was dried after smoothing and its whiteness was measured (Elrepho R 457).

The results are shown in Table 1.

TABLE 1

| Dispersions used | Whiteness R 457 (in %) |
|---|---|
| A | 51.4 |
| B | 50.8 |
| C | 51.2 |
| D | 51.0 |
| E | 51.2 |
| F | 51.6 |
| G | 50.9 |
| H | 51.5 |
| For comparison: | |
| Commercially available dispersion containing fatty acid | 49.5 |

By comparison with the commercially available dispersion containing fatty acid, the dispersions according to the invention gave equivalent deinking results. The major advantage of the dispersions according to the invention was that the stability of the ink-containing froths formed during flotation was considerably lower than that of the ink-containing froth of the commercially available fatty-acid-containing dispersion so that no foam inhibitor had to be added to the paper stock suspensions.

We claim:

1. The process of regenerating wastepaper containing printing ink comprising the steps of;

(1) fiberizing said wastepaper in an aqueous alkaline deinking solution containing no foam inhibitors and a deinking effective quantity of a deinking agent consisting of (a) a $C_6$–$C_{22}$ carboxylic acid or resinic acid and (b) a $C_6$–$C_{22}$ oxoalcohol alkoxylated with from about 2 to less than 6 moles of a $C_2$–$C_4$ alkylene oxide to detach ink particles from said wastepaper, and (2) removing the detached ink particles from the deinking solution.

2. A process as in claim 1 wherein said carboxylic acid comprises a $C_{12}$–$C_{18}$ aliphatic carboxylic acid.

3. A process as in claim 1 wherein said oxoalcohol comprises a $C_6$–$C_{13}$ oxoalcohol alkoxylated with about 3 to about 5 mols of ethylene oxide or propylene oxide.

4. A process as in claim 1 wherein said carboxylic acid or resinic acid and said alkoxylated oxoalcohol are present in an amount of from about 0.2 to about 2% by weight, based on the air-dry weight of said wastepaper.

5. A process as in claim 1 wherein said fiberizing step is conducted at a temperature of from about 20° to about 60° C. for a period of about 1 to about 3 hours.

* * * * *